(12) United States Patent
Koga et al.

(10) Patent No.: US 8,144,845 B2
(45) Date of Patent: Mar. 27, 2012

(54) COMMUNICATION APPARATUS AND COMMUNICATION METHOD

(75) Inventors: Hisao Koga, Fukuoka (JP); Nobutaka Kodama, Fukuoka (JP)

(73) Assignee: Panasonic Corporation, Osaka (JP)

( * ) Notice: Subject to any disclaimer, the term of this patent is extended or adjusted under 35 U.S.C. 154(b) by 1318 days.

(21) Appl. No.: 11/654,622

(22) Filed: Jan. 18, 2007

(65) Prior Publication Data

US 2007/0167144 A1 Jul. 19, 2007

(30) Foreign Application Priority Data

Jan. 19, 2006 (JP) ................................. 2006-011382

(51) Int. Cl.
*H04M 11/00* (2006.01)
(52) U.S. Cl. .................. 379/90.01; 379/93.07
(58) Field of Classification Search ............... 379/90.01, 379/93.07, 93.28, 100.12
See application file for complete search history.

(56) References Cited

U.S. PATENT DOCUMENTS

| | | | |
|---|---|---|---|
| 5,469,427 A | 11/1995 | Sato | |
| 2001/0054109 A1 | 12/2001 | Sainomoto et al. | |
| 2003/0142664 A1 | 7/2003 | Gerszberg et al. | |
| 2004/0002330 A1 | 1/2004 | Chitrapu | |
| 2004/0017824 A1 | 1/2004 | Koenck et al. | |
| 2004/0151136 A1 | 8/2004 | Gage | |
| 2011/0093616 A1* | 4/2011 | Iwamura | 709/241 |

FOREIGN PATENT DOCUMENTS

| | | |
|---|---|---|
| JP | 5-95373 | 4/1993 |
| JP | 7-95132 | 4/1995 |
| JP | 2001-119436 | 4/2001 |
| JP | 2002 319947 | 10/2002 |
| JP | 2002 319949 | 10/2002 |
| JP | 2003-8681 | 1/2003 |
| JP | 2004-336206 | 11/2004 |
| WO | 9930478 | 6/1999 |
| WO | 0241580 | 5/2002 |
| WO | 2004 056044 | 7/2004 |

OTHER PUBLICATIONS

International Search Report dated Jul. 12, 2007.
R. Katz et al. "The Bay Area Research Wireless Access Network (BARWAN)," Digest of Papers of Compcon (Computer Society of Conference) 1996 Technologies For The Information Superhighway. Santa Clara, Feb. 25-28, 1996, Digest of Papers of the Computer Society Computer Conference Compcon. Los Alomitos, IEEE Comp. Soc. press, vol. Conf. 41, Feb. 25, 1996, pp. 15-20.
European Office Action dated Dec. 9, 2011.

* cited by examiner

*Primary Examiner* — Stella Woo
(74) *Attorney, Agent, or Firm* — Dickinson Wright PLLC

(57) ABSTRACT

A communication apparatus 100 is equipped with, as plural communication sections capable of communicating with another communication apparatus over different transmission lines, a powerline communication section which performs a wired transmission using a powerline PL and a wireless communication section which performs a wireless transmission. The communication apparatus 100 causes at least one of the powerline communication section and the wireless communication section to perform a communication. If at least one of the powerline communication section and the wireless communication section is not to perform a communication, operation of that communication section is suspended.

19 Claims, 11 Drawing Sheets

COMMUNICATION APPARATUS AND COMMUNICATION METHOD

BACKGROUND

The present invention relates to a communication apparatus which communicates with another communication apparatus and a related communication method.

Communication systems have been proposed which employ both of a wired communication method such as powerline communication and a wireless communication method such as wireless LAN. Those communication systems have a communication method switching means for switching between a wired communication apparatus and a wireless communication apparatus. The communication method switching means switches to the wired communication apparatus when the communication state with the wireless communication apparatus is poor and to the wireless communication apparatus when the communication state with the wired communication apparatus is poor (refer to Patent document 1, for example).

[Patent document 1] JP-A-2002-319947

However, the above communication systems may encounter a situation that when switching is made to the other communication method upon variation in the transmission line status of one of the powerline communication method and the wireless communication method, the transmission line status of the other communication method is very poor and a desired data transmission cannot be made even after the communication method switching. As such, the method in which switching is made between the powerline communication method and the wireless communication method in accordance with their respective transmission line statuses and a data transmission is performed by using one of the two communication methods is associated with a problem that it is difficult to realize a stable, high-quality data transmission at all times.

Another approach is to always perform communications using both communication methods by employing a configuration which enables such operation. However, this is associated with a problem of a high power consumption.

SUMMARY

The present invention has been made in view of the above circumstances, and an object of the invention is therefore to provide a communication apparatus and a communication method which make it possible to communicate with another communication apparatus over plural transmission lines while keeping the power consumption low.

A first aspect of the invention provides a communication apparatus which performs a communicating operation over a plurality of transmission lines, the communication apparatus comprising a first communication section for performing a communicating operation over a first transmission line; a second communication section for performing a communicating operation over a second transmission line different from the first transmission line; and a control section for suspending the communicating operation of one of the first communication section and the second communication section.

In this configuration, of the plural communication sections capable of communicating with another communication apparatus over different transmission lines, a communication section which is not to perform a communication is suspended. Therefore, data transmission with a low power consumption can be realized.

Another aspect of the invention provides a communication apparatus which performs a communication over a plurality of transmission lines, the communication apparatus comprising a first communication section for performing a communication over a first transmission line; a second communication section for performing a communication over a second transmission line different from the first transmission line; an information acquiring section for acquiring transmission line information representing status of each of the first transmission line and the second transmission line; and a control section for selecting one of the first communication section and the second communication section on the basis of transmission line information.

This configuration makes it possible to perform a communication over a proper transmission line because a transmission line can be chosen in accordance with transmission line statuses.

Further aspect of the invention provides a communication method for performing a communication over a plurality of transmission lines, the communication method comprising the steps of. performing a communicating operation over a first transmission line; performing a communicating operation over a second transmission line different from the first line; and suspending the communicating operation of one of the communicating operation over the first transmission line and the communicating operation over the second transmission line.

In this constitution, of the plural communication sections capable of communicating with another communication apparatus over different transmission lines, a communication section which is not to perform a communication is suspended. Therefore, data transmission with a low power consumption can be realized.

The invention can provide a communication apparatus and a communication method which make it possible to communicate with another communication apparatus over plural transmission lines while keeping the power consumption low.

DETAILED DESCRIPTION

A communication apparatus according to an embodiment of the present invention will be hereinafter described with reference to FIGS. 1-13. The communication apparatus according to the embodiment is such as to be able to perform a communication using plural communication methods. The following description will be directed to an exemplary communication terminal which can perform a powerline communication (hereinafter referred to as "PLC") using a powerline as a transmission line and a wireless communication using a wireless line, is connected to different communication media, and is configured as a modem. And the following description will be directed to a case that the predetermined frequency band of the powerline communication is a wide band (e.g., 2 to 30 MHz) of a multi-carrier communication method. However, the predetermined frequency band is not limited to the 2 to 30 MHz band and may be set as desired. For example, it may be a 1.7 to 80 MHz band.

Figure 1:
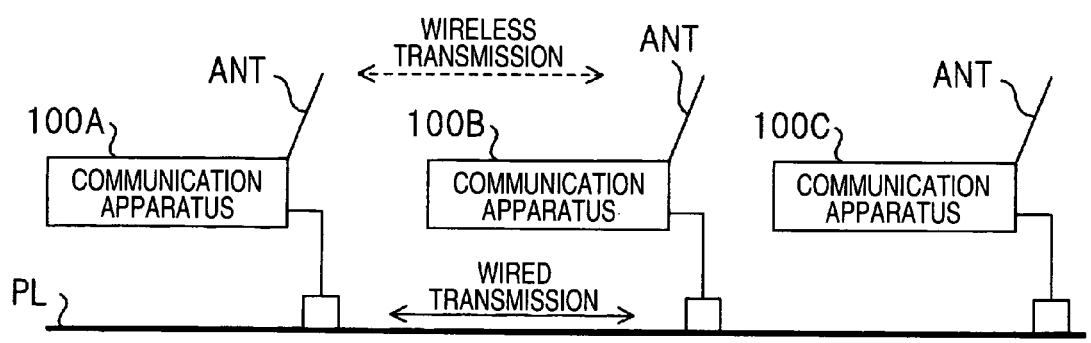
FIG. 1 is an explanatory diagram showing the concept of a network using communication apparatus according to an embodiment of the present invention.

FIG. 1 is an explanatory diagram showing the concept of a network using the communication apparatus according to the embodiment of the invention. As shown in FIG. 1, communication apparatus 100A, 100B, and 100C are connected to each other so as to not only communicate with each other over a powerline PL but also communicate with each other wirelessly via antennas ANT. In the following description, the communication apparatus 100A, 100B, and 100C will be referred to simply as "communication apparatus 100" when they need not be discriminated form each other.

Figure 2:
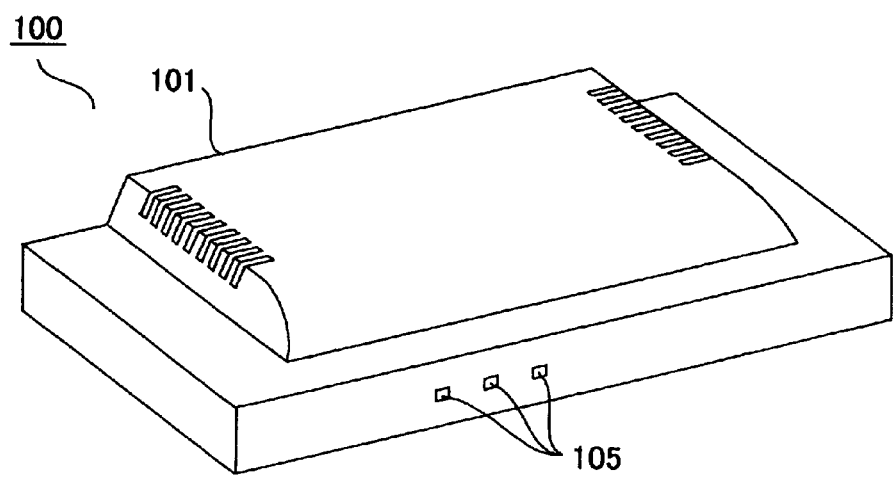
FIG. 2 is a perspective view showing a front-side appearance of the communication apparatus according to the embodiment of the invention.
Figure 3:
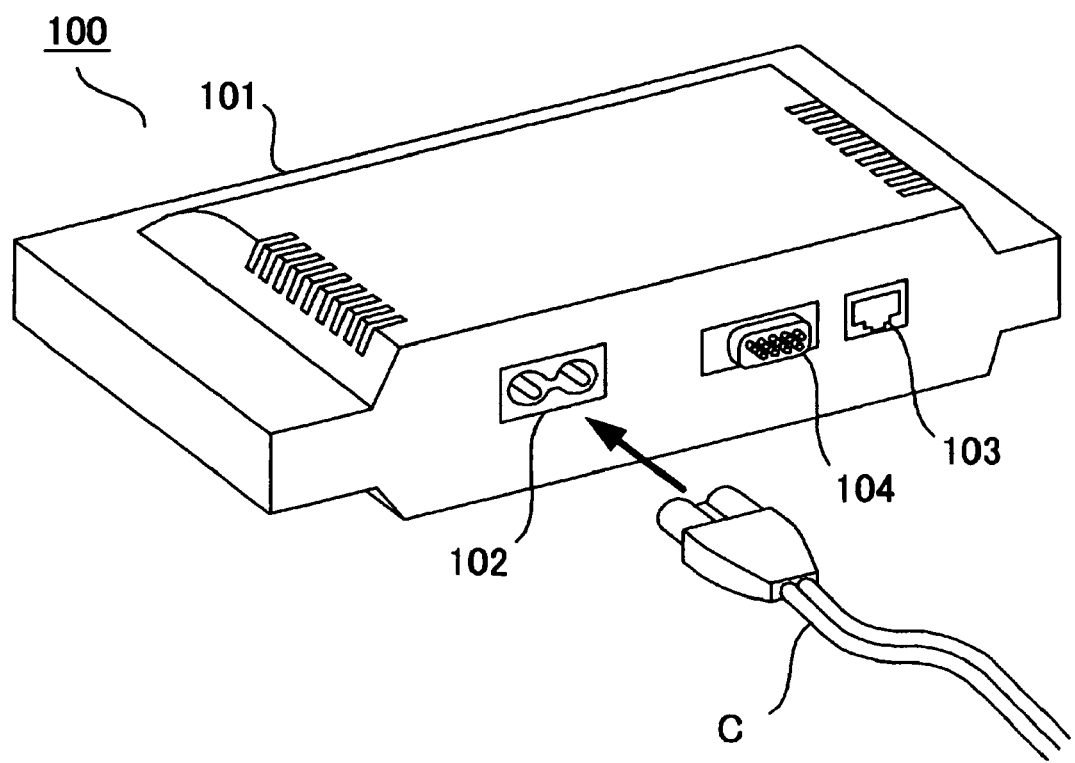
FIG. 3 is a perspective view showing a back-side appearance of the communication apparatus according to the embodiment of the invention.

A specific configuration of the communication apparatus 100 according to the embodiment will be described below. FIG. 2 is a perspective view showing a front-side appearance of the communication apparatus according to the embodiment of the invention. FIG. 3 is a perspective view showing a back-side appearance of the communication apparatus according to the embodiment of the invention.

The communication apparatus 100 according to the embodiment of the invention is a communication terminal which performs a powerline communication and, more specifically, is configured as a model (PLC modem). However, in the invention, the communication apparatus is not limited to a modem and may be electronic equipment (e.g., a home electrical appliance such as a TV receiver) incorporating a modem.

The communication apparatus 100 has a case 101. As shown in FIG. 2, display units 105 such as LEDs (light-emitting diodes) are provided on the front surface of the case 101. As shown in FIG. 3, a power connector 102, a LAN (local area network) modular jack 103 such as an RJ45 jack, and a Dsub connector 104 are provided on the back surface of the case 101. An AC power cord C such as a parallel cable is connected to the power connector 102. A LAN cable (not shown) is connected to the modular jack 103. A Dsub cable (not shown) is connected to the Dsub connector 104. In the example of FIGS. 2 and 3, an antenna ANT is provided inside the case 101.

Figure 4:
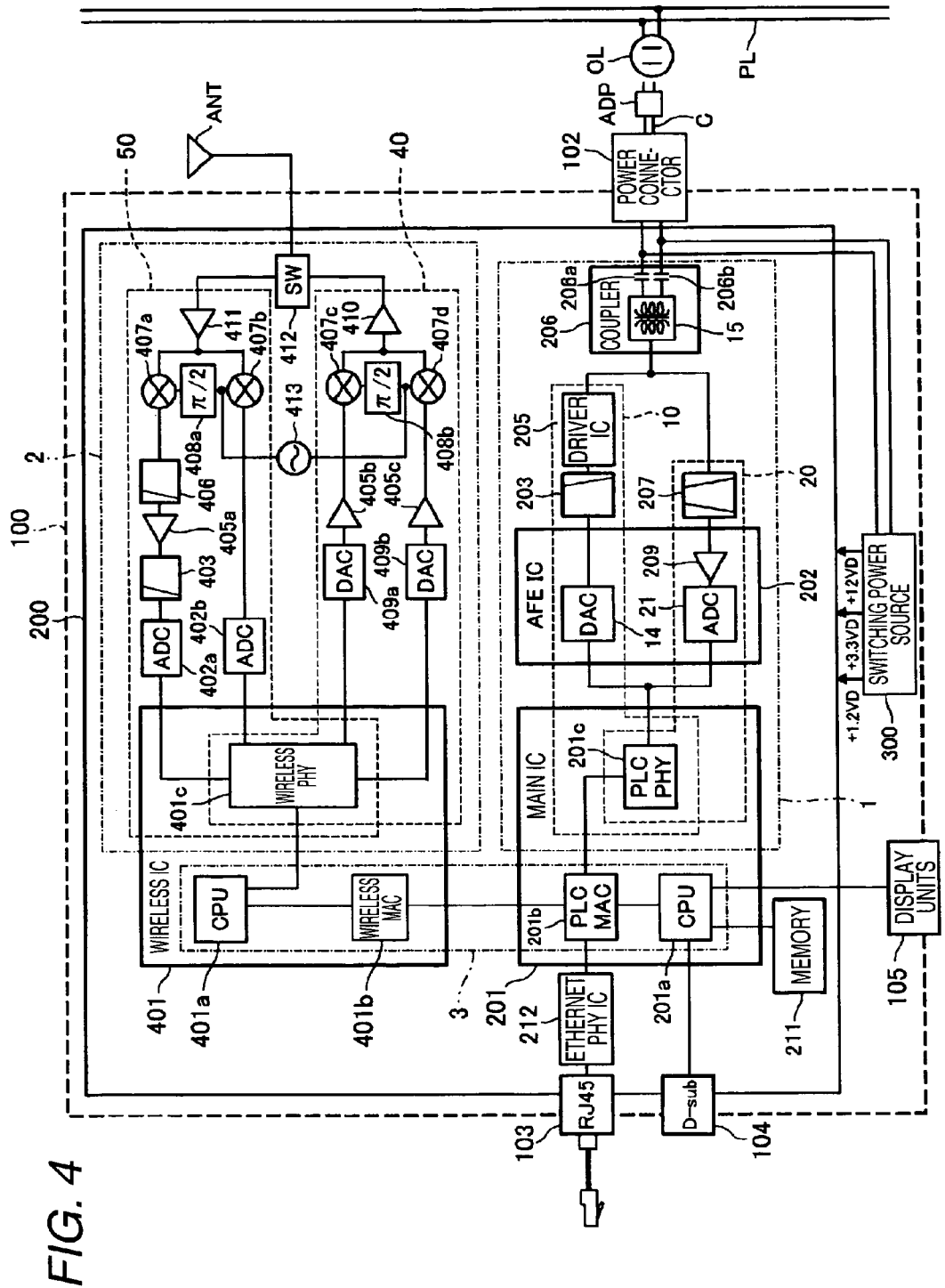
FIG. 4 is a block diagram showing exemplary hardware of the communication apparatus according to the embodiment of the invention.

FIG. 4 is a block diagram showing exemplary hardware of the communication apparatus according to the embodiment of the invention. As shown in FIG. 4, the communication apparatus 100 is equipped with a circuit module 200 and a switching power source 300. The switching power source 300 supplies voltages of +1.2 V, +3.3 V, and +12 V to the circuit module 200.

The circuit module 200 is provided with a wireless communication circuit and a PLC communication circuit. As shown in a top part of FIG. 4, the wireless communication circuit has a wireless IC (integrated circuit) 401. The wireless IC 401 is composed of a CPU (central processing unit) 401a, a wireless MAC (media access control) block 401b, and a wireless PHY (physical layer) block 401c. The CPU 401a is connected to the antenna ANT via a wireless communication section 2 (indicated by a chain line). The wireless communication section 2 is composed of plural circuit elements and includes a receiving circuit 50 (indicated by a broken line), a transmitting circuit 40 (indicated by a broken line), a switch (SW) 412 for switching between reception and transmission, and a voltage-controlled oscillator (VCO) 413. The antenna type may be determined as desired. For example, the antenna ANT may be any of a monopole antenna, a dipole antenna, a chip antenna, and a rod antenna.

The receiving circuit 50 includes circuit elements of a low-noise amplifier (LNA) 411, mixers 407a and 407b, a phase shifter 408a, highpass filters 403 and 406, an amplifier 405a, A/D converters (ADCs) 402a and 402b, the wireless PHY block 401c, etc. The transmitting circuit 40 includes circuit elements of D/A converters (DACs) 409a and 409b, amplifiers 405b and 405c, mixers 407c and 407d, a phase shifter 408b, a power amplifier 410, the wireless PHY block 401c, etc.

As shown in a bottom part of FIG. 4, the PLC communication circuit has a main IC 201. The main IC 201 is composed of a CPU 201a, a PLC MAC block 201b, and a PLC PHY block 201c. The CPU 201a is connected to the power connector 102 via a powerline communication section 1 (indicated by a chain line). The powerline communication section 1 is composed of plural circuit elements and includes a receiving circuit 10 (indicated by a broken line), a transmitting circuit 20 (indicated by a broken line), and a coupler 206. The coupler 206 has a coil transformer 15 and capacitors 206a and 206b. The AC power cord C is connected to the power connector 102 and a power adaptor ADP is provided at one end of the AC power cord C. The power adaptor ADP has a plug, which is configured so as to be able to be inserted into a socket such as a wall socket OL which is connected to the powerline PL.

The transmitting circuit 10 includes circuit elements of a driver IC 205, a lowpass filter 203, a D/A converter (DAC) 14 of an AFE (analog front end) IC 202, the PLC PHY block 201c, etc. The receiving circuit 20 includes circuit elements of a bandpass filter 207, a variable amplifier (VGA) 209 and an A/D converter (ADC) 21 of the AFE IC 202, the PLC PHY block 201c, etc.

The PLC MAC block 201b of the main IC 201 is connected to the modular lack 103 via an Ethernet (registered trademark) PHY (physical layer) IC 212. The CPU 201 a of the main IC 201 is connected to the Dsub connector 104 and a memory 211.

Figure 5:
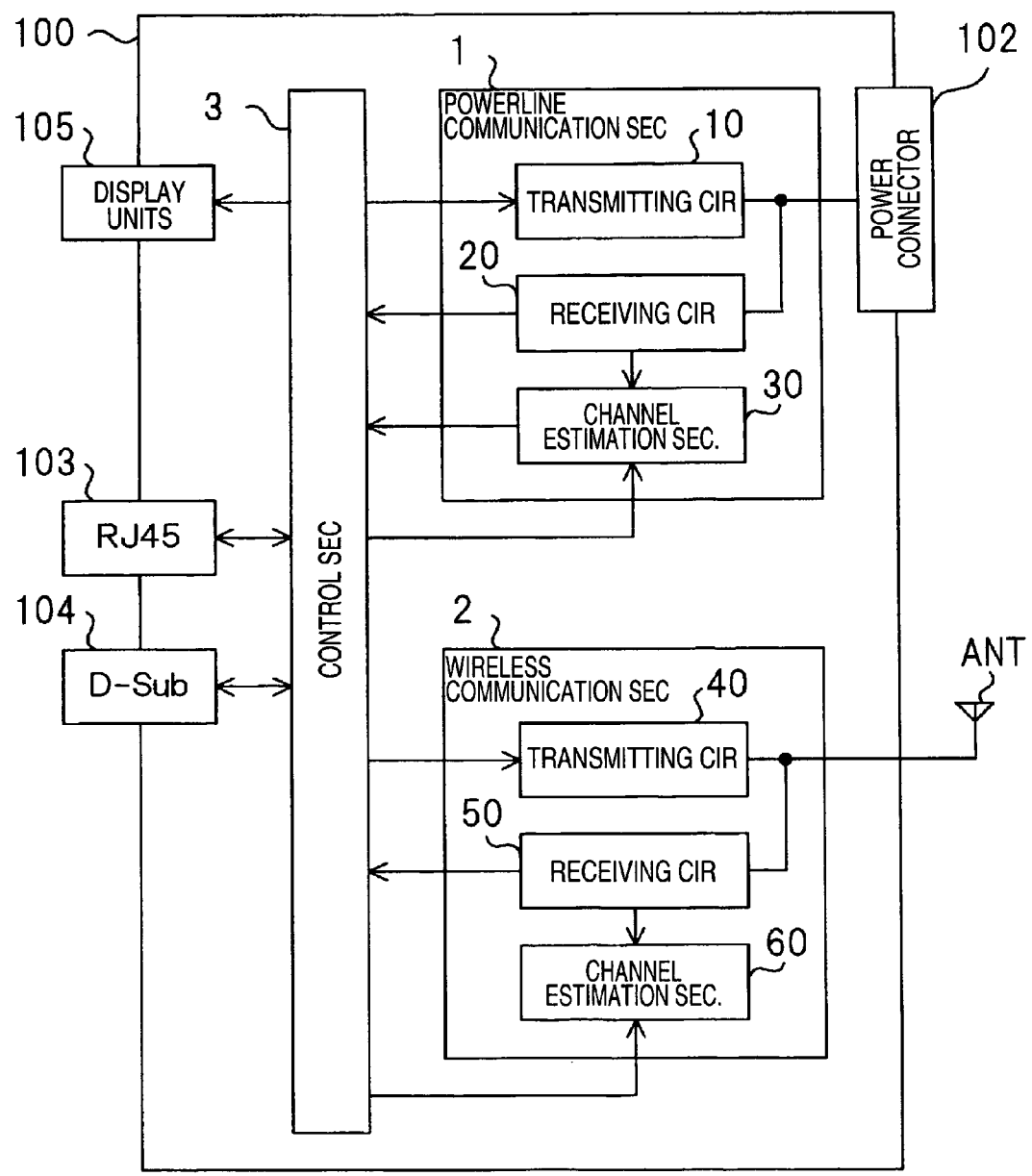
FIG. 5 is a block diagram showing main functions of the communication apparatus according to the embodiment of the invention.

FIG. 5 is a block diagram showing main functions of the communication apparatus according to the embodiment of the invention. To facilitate understanding of the invention, FIG. 5 shows only main ones of the components in the hardware bock diagram of FIG. 4.

As shown in FIG. 5, the communication apparatus 100 according to the embodiment is equipped with, as plural communication sections for performing a communication over different transmission lines, the two communication sections which are the powerline communication section 1 for performing a powerline communication via the power connector 102 and the wireless communication section 2 for performing a wireless communication via the antenna ANT. As such, the communication apparatus 100 can communicate with a subject communication apparatus by both communication methods, that is, powerline communication and wireless communication.

As shown in FIG. 5, the powerline communication section 1 is provided with the transmitting circuit 10, the receiving circuit 20, and a channel estimation section 30. The channel estimation section 30 is implemented by the PLC PHY block 201c of the main IC 201 shown in FIG. 4. Connected to the powerline PL (not shown) via the power connector 102, the powerline communication section 1 performs a powerline communication by a multi-carrier communication method, for example. The transmitting circuit 10 performs modulation etc. on transmission data that are supplied from a control section 3 and sends out a resulting transmission signal to the powerline PL via the power connector 102. The control section 3 is implemented by the CPU 201a and the PLC MAC block 201b of the main IC 201. The receiving circuit 20 performs demodulation etc. on a reception signal that is received from the powerline PL via the power connector 102, and outputs resulting reception data to the control section 3. The channel estimation section 30 estimates a transmission line status of the powerline PL as a connected transmission line on the basis of the reception signal received by the receiving circuit 20, and outputs transmission line estimation data (described later) to the control section 3.

As shown in FIG. 5, the wireless communication section 2 is provided with the transmitting circuit 40, the receiving circuit 50, and a channel estimation section 60. The channel estimation section 60 is implemented by the wireless PHY block 401c of the wireless IC 401 shown in FIG. 4. The wireless communication section 2 performs a wireless communication with an apparatus that is wirelessly connected via the antenna ANT, by a wireless LAN communication method according to IEEE (The institute of Electrical and Electronic Engineers) 802.11, for example. The transmitting circuit 40 performs modulation, conversion into a radio frequency band, and other processing on transmission data that are supplied from the control section 3, and sends out a resulting transmission signal from the antenna ANT. The receiving circuit 50 performs conversion into a baseband, demodulation, and other processing on a reception signal received from the antenna ANT, and outputs resulting reception data to the control section 3. The channel estimation section 60 estimates a transmission line status of the wireless line as a connected transmission line on the basis of the reception signal received by the receiving circuit 50, and outputs transmission line estimation data to the control section 3.

The control section 3 relays data between the communication section (powerline communication section 1 or wireless communication section 2) and the 5 connector (RJ45 modular jack 103, DSsub connector 104, or the like). The control section 3 is implemented by the CPU 201a and the PLC MAC block 201b of the main IC 201 and the CPU 401a and the wireless MAC block 401b of the wireless IC 401 (see FIG. 4), and controls the powerline communication section 1, the wireless communication section 2, and the display units 105. In particular, the control section 3 controls the operation states of the powerline communication section 1 and the wireless communication section 2 to render those in a communication-possible state or a suspension state on the basis of transmission line estimation data which are supplied from the channel estimation sections 30 and 60. A control is made so as to render at least one communication section in a communication-possible state. At least part of the functions of a communication section (powerline communication section 1 or wireless communication section 2) being in a suspension state (hereinafter referred to as "sleep mode") are suspended.

In this specification, the term "to suspend a communication section" means rendering signal transmission/reception processing in a suspension state, more specifically, suspending all or part of the operation of at least the receiving circuit. All or part of the operation of the transmitting circuit may be suspended together with that of the receiving circuit. Part of the operation of the receiving circuit can be suspended by suspending or lowering the performance of the function of at least one of the plural circuit elements constituting the receiving circuit. Part of the operation of the transmitting circuit can be suspended by suspending or lowering the performance of the function of at least one of the plural circuit elements constituting the transmitting circuit.

For example, the function of a circuit element may be suspended in the following manners. The function (of converting or amplifying a signal) of an analog circuit element such as a D/A converter, an A/D converter, or an amplifier can be suspended by lowering its power supply voltage. A function (of outputting a clock signal) of an IC can be suspended by suspending generation of a clock signal by the IC. Further, the function (of performing transmission line estimation) of the channel estimation section 30 or 60 can be suspended. A communication section may be caused to perform only a receiving operation by suspending the function (of transmitting a signal) of the transmitting circuit. On the other hand, for example, the function of a circuit element may be lowered in performance in the following manners. The function of a circuit element can be lowered in performance by controlling a characteristic value of the circuit element. For example, the function (of amplifying a signal) of an amplifier can be lowered in performance by lowering its gain. A function, relating to a clock frequency, of another circuit can be lowered in performance by lowering the clock frequency of an IC. Lowering the performance of the function of a circuit element instead of suspending it completely allows the circuit element to recover from a suspension state to an operation state in a relatively short time.

For example, the display units 105, which indicate various statuses such as a power status and a communication status of the communication apparatus 100, are light-emitting elements such as light-emitting diodes (LEDs) or a display device such as a liquid crystal display device.

Figure 6:
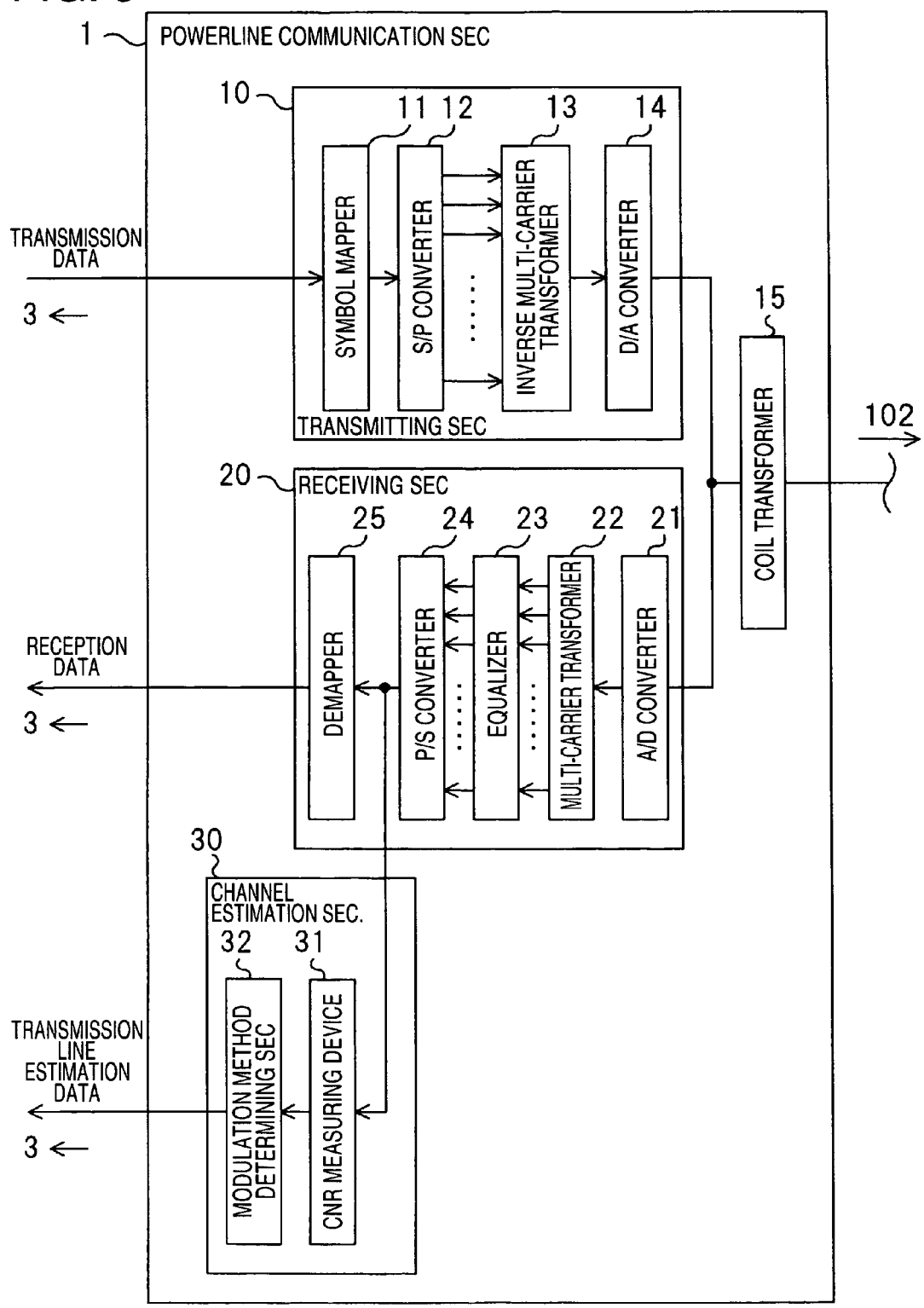
FIG. 6 is a block diagram showing main functions of a powerline communication section of the communication apparatus according to the embodiment of the invention.

FIG. 6 is a block diagram showing main functions of the powerline communication section of the communication apparatus according to the embodiment of the invention. Like FIG. 5, to facilitate understanding of the invention, FIG. 6 shows only main ones of the components in the hardware block diagram of FIG. 4. As shown in FIG. 6, the transmitting section 10 of the powerline communication section 1 is provided with a symbol mapper 11 which converts bit data as a transmission signal into symbol data (symbol mapping), an S/P converter 12 which converts serial data into parallel data, an inverse multi-carrier transformer 13 (e.g., inverse Fourier transformer (IFFT) or inverse wavelet transformer (IDWT))

which performs a desired frequency-time conversion, and the D/A converter 14 which converts digital data into analog data.

The receiving section 20 is provided with the A/D converter 21 which converts analog data into digital data, a multi-carrier transformer 22 (e.g., Fourier transformer (FFT) or wavelet transformer (DWT)) which performs a desired time-frequency conversion, an equalizer 23 which corrects a reception signal so as to cancel out influence of a transmission line, a P/S converter 24 which converts parallel data into serial data, and a demapper 25 which converts mapped symbol data into bit data as a reception signal.

The coil transformer 15 supplies, as a powerline communication signal, a signal coming from the transmitting section 10 to the powerline PL via the power connector 102, and extracts only a powerline communication signal from the powerline PL and outputs it to the receiving section 20.

The channel estimation section 30 has a CNR measuring device 31 which measures a CNR (carrier-to-noise ratio; an exemplary parameter indicating a noise level) of data that are output from the P/S converter 24 of the receiving section 20 and a modulation method determining section 32 which determines a primary modulation method on the basis of the measured CNR. The thus-configured channel estimation section 30 outputs transmission line estimation data to the control section 3.

Figure 7:
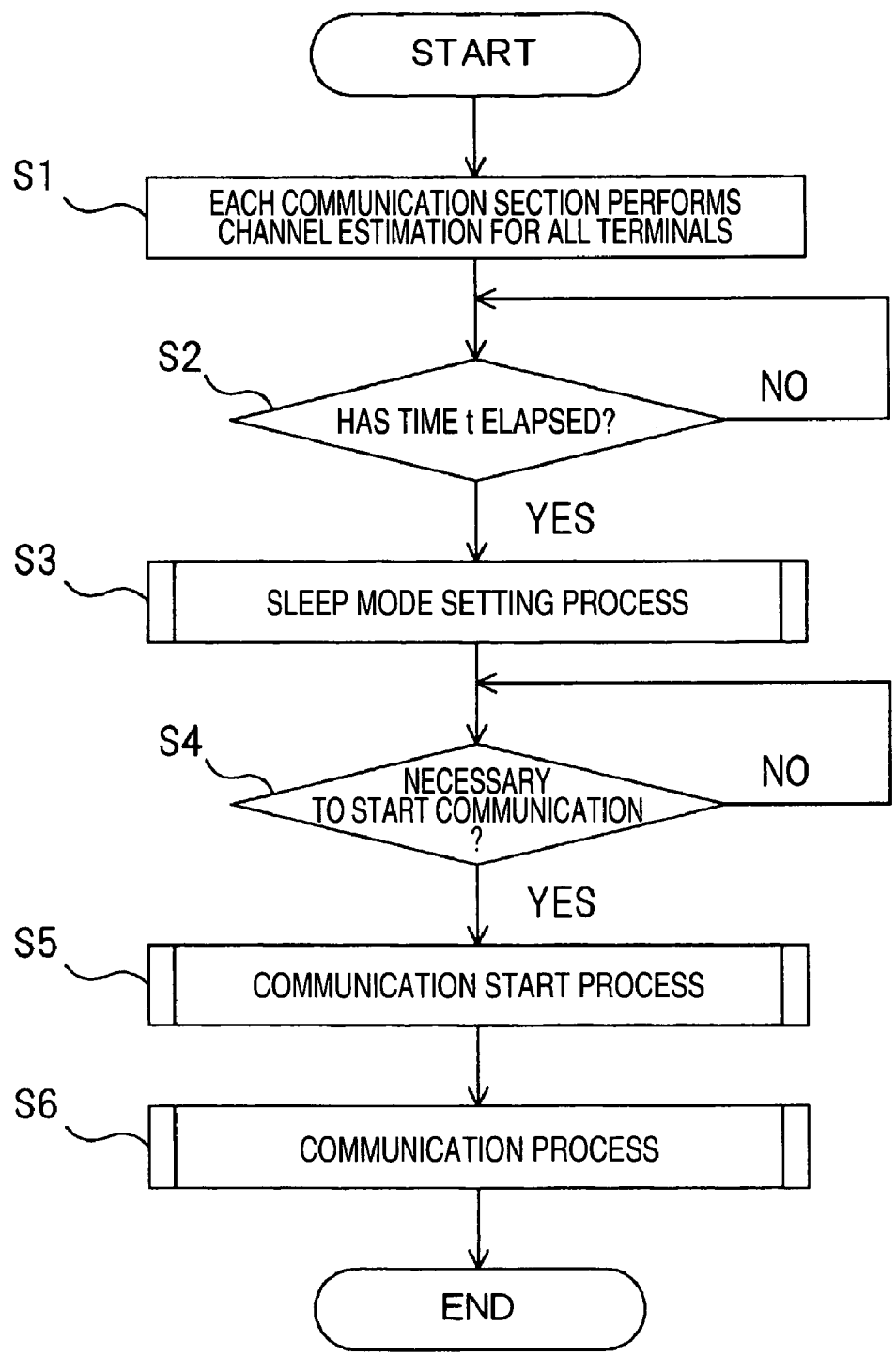
FIG. 7 is a flowchart showing the procedure of a communication method according to the embodiment of the invention.

Next, the operation procedure of the communication apparatus according to the embodiment will be described. FIG. 7 is a flowchart showing the procedure of a communication method according to the embodiment of the invention. As shown in FIG. 7, first, as soon as the communication apparatus 100 is powered on and thereby activated, the control section 3 causes transmission line estimation in each of the communication sections (i.e., powerline communication section 1 and wireless communication section 2) (step S1). Then, the control section 3 monitors the elapsed time from a predetermined time point (e.g., activation time). If a predetermined time t has elapsed (step S2: yes), the control section 3 executes a sleep mode setting process for the powerline communication section 1 and the wireless communication section 2 (step S3).

Then, the control section 3 performs monitoring to determine whether to start a communication, that is, to send out a communication start request from its own communication apparatus or to receive a communication start request from another communication apparatus. If it is necessary to start a communication (step S4: yes), the control section executes a communication start process for a communication section which needs to perform a communication (step S5).

If it is necessary to make a communication start request from its own communication apparatus, the communication section 3 does so using all the communication sections. This makes it possible to make a communication start request reliably even if whichever communication section of a subject communication apparatus is set in a sleet state. If a communication section being in a communication-possible state of a subject communication apparatus is known in advance, the control section 3 may make a communication start request using a corresponding communication section.

Then, during a communication, the control section 3 executes, for the powerline communication section 1 and the wireless communication section 2, a communication process in which a sleep mode is set or canceled when necessary on the basis of transmission line statuses etc. (step S6). Next, the details of the sleep mode setting process (step S3), the communication start process (step S5), and the communication process (step S6) will be described with reference to FIGS. 8-12.

Figure 8:
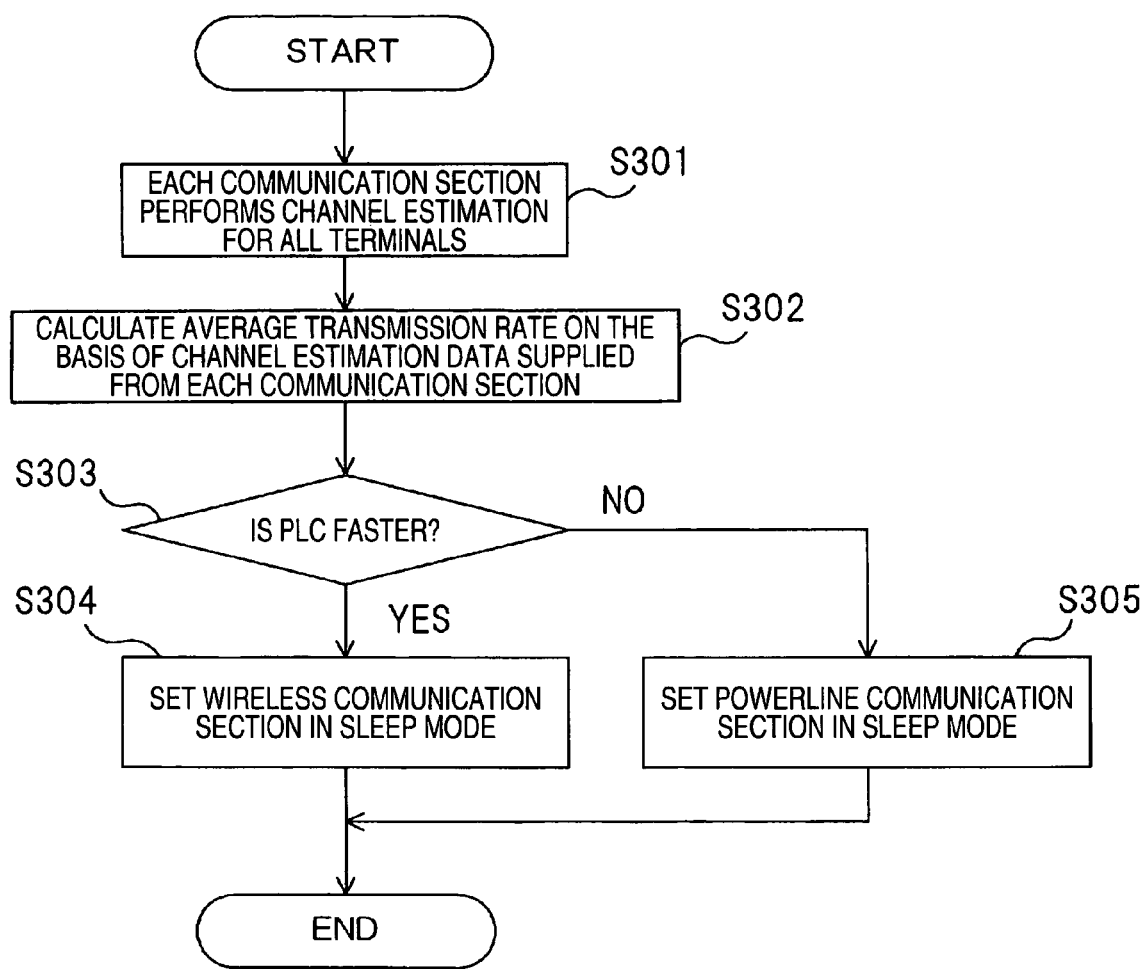
FIG. 8 is a flowchart showing a first exemplary procedure of a sleep mode setting process of the communication method according to the embodiment of the invention.

FIG. 8 is a flowchart showing a first exemplary procedure of the sleep mode setting process (step S3 in FIG. 7) of the communication method according to the embodiment of the invention. As shown in FIG. 8, the channel estimation section of each communication section, that is, each of the channel estimation section 30 of the powerline communication section 1 and the channel estimation section 60 of the wireless communication section 2, performs transmission line estimation (step S301). In the transmission line estimation process, a transmission line estimation frame is transmitted to a destination communication apparatus 100. The transmission line estimation frame is a frame whose signal level (voltage and phase) is known; for example, it is a frame whose signal level is constant in a frequency band used. The destination communication apparatus 100 returns the received transmission line estimation frame to the source communication apparatus 100. Each of the channel estimation sections 30 and 60 of the source communication apparatus 100 acquires transmission line information indicating a transmission line status on the basis of the pre-transmission and post-transmission transmission line estimation frames. In this embodiment, each of the channel estimation sections 30 and 60 compares the returned transmission line estimation frame with the pre-transmission transmission line estimation frame and outputs, as transmission line information, transmission line estimation data indicating signal level differences in the frequency band. Based on the transmission line estimation data supplied from each of the channel estimation sections 30 and 60, the control section 3 calculates an average transmission rate to be attained when a communication is performed by using each of the powerline communication section 1 and the wireless communication section 2 (step S302). Examples of the transmission line information are a CNR, a CINR (carrier-to-interference-plus-noise ratio), and an SN ratio. Transmission line information may be acquired from another communication apparatus (e.g., a channel estimation section) instead of each of the channel estimation sections 30 and 60 provided inside the communication apparatus 100 concerned.

Then, the control section 3 compares the average transmission rate of a communication using the powerline communication section 1 with that of a communication using the wireless communication section 2. If the average transmission rate of a communication using the powerline communication section 1 is higher than or equal to that of a communication using the wireless communication section 2 (S303: yes), the control section 3 sets the wireless communication section 2 in a sleep mode (step S304). If the average transmission rate of a communication using the powerline communication section 1 is lower than that of a communication using the wireless communication section 2 (S303: no), the control section 3 sets the powerline communication section 1 in a sleep mode (step S305). That is, the control section 3 chooses one of the powerline communication section 1 and the wireless communication section 2 on the basis of the average transmission rates.

According to the above procedure, one communication section that enables a better communication is set in a communication-possible state and the other communication section is set in a sleep mode, as a result of which the power consumption can be reduced.

The description made above with reference to FIG. 8 is directed case that the control section 3 sets the communication sections having the higher transmission rate. Instead, the control section 3 may set the communication sections based on an input signal. The communication apparatus 1 may have input means such as a switch (ex. button, DIPswitch, and touch-sensitive switch) and a connector (USB connector: Universal Serial Bus connector, D-sub connector, IEEE1394 connector).

In case the input means is the switch, the control section 3 calculates the transmission rate. The control section 3 displays information regarding the calculated transmission rate with the display unit 105. For example, the control section 3 lights a red LED corresponding to the communication section having the higher transmission rate and an orange LED corresponding to the communication section having the lower transmission rate.

User can tell which transmission rate is higher by color of the LEDs. When user pushes the switch, the control section 3 receives the input signal. The control section 3 sets one of the communication section 1 and the wireless communication section 2 based on the received input signal. In case the input means is the connector capable of connecting a personal computer through a cable, when user operate a keyboard or a display of the personal computer, the control section 3 receives the input signal. As well as the switch, the control section 3 sets one of the communication section 1 and the wireless communication section 2 based on the received input signal.

Figure 9:
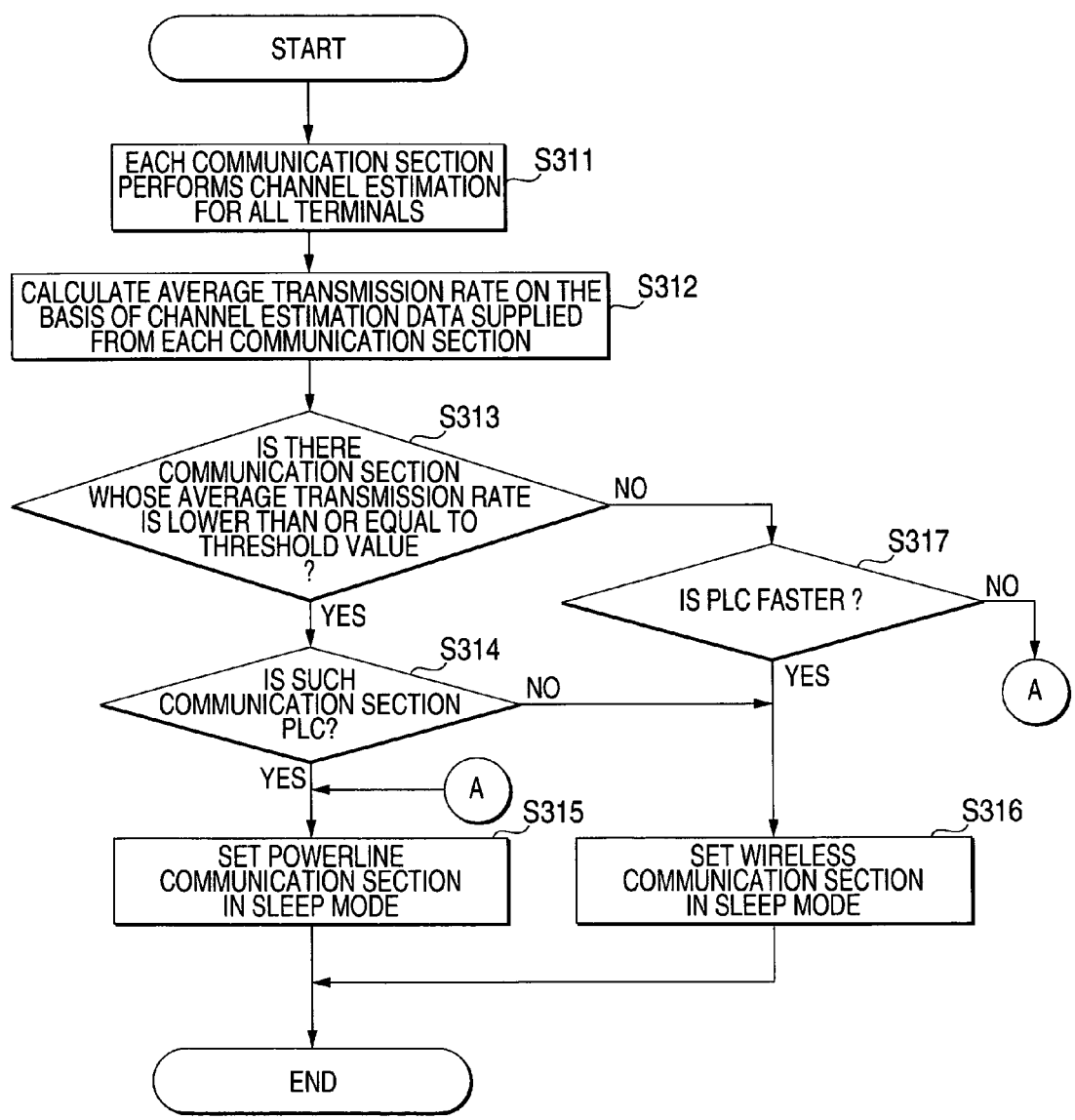
FIG. 9 is a flowchart showing a second exemplary procedure of the sleep mode setting process of the communication method according to the embodiment of the invention.

FIG. 9 is a flowchart showing a second exemplary procedure of the sleep mode setting process (step S3 in FIG. 7) of the communication method according to the embodiment of the invention. As shown in FIG. 9, as in step S301, the channel estimation section of each communication section, that is, each of the channel estimation section 30 of the powerline communication section 1 and the channel estimation section 60 of the wireless communication section 2, performs transmission line estimation (step S311). Then, as in step S302, based on the transmission line estimation data supplied from each of the channel estimation sections 30 and 60, the control section 3 calculates an average transmission rate to be attained when a communication is performed by each of the powerline communication section 1 and the wireless communication section 2 (step S312).

Then, the control section 3 compares the average transmission rate of a communication using the powerline communication section 1 and that of a communication using the wireless communication section 2 with a predetermined threshold value (e.g., 100 Mbps) (step S313). If at least one of the average transmission rates of communications using the powerline communication section 1 and the wireless communication section 2, respectively, is lower than the threshold value (S313: yes), the following steps will be executed. If the average transmission rate of a communication using the powerline communication section 1 is lower than the threshold value (step S314: yes), the control section 3 sets the powerline communication section 1 in a sleep mode (step S315). In steps S314 and S315, if the average transmission rate of a communication using the powerline communication section 1 is lower than that of a communication using the wireless communication section 2, the control section 3 may set the powerline communication section 1 in a sleep mode. If the communication section whose average transmission rate being lower than the threshold value is not the powerline communication section 1, that is, it is the wireless communication section 2 (step S3 14: no), the control section 3 sets the wireless communication section 2 in a sleep mode (step S316).

On the other hand, if neither of the average transmission rates of communications using the powerline communication section 1 and the wireless communication section 2 is lower than the threshold value (S313: no), the control section 3 compares the average transmission rate of a communication using the powerline communication section 1 with that of a communication using the wireless communication section 2. If the average transmission rate of a communication using the powerline communication section 1 is higher than or equal to that of a communication using the wireless communication section 2 (S317: yes), the control section 3 sets the wireless communication section 2 in a sleep mode (step S316). If the average transmission rate of a communication using the powerline communication section 1 is lower than that of a communication using the wireless communication section 2 (S317: no), the control section 3 sets the powerline communication section 1 in a sleep mode (step S315).

According to the above procedure, a communication section whose transmission line status does not satisfy the predetermined condition (e.g., the average transmission rate is higher than or equal to a predetermined threshold value) is set in a sleep mode. This makes it possible to prevent the network from becoming unstable (e.g., a link cannot be established with a subject communication apparatus). If transmission line statuses of all the communication sections satisfy the predetermined condition, a communication is performed by using a communication section that enables a better communication and the other communication section is set in a sleep mode, as a result of which the power consumption can be reduced.

Figure 10:
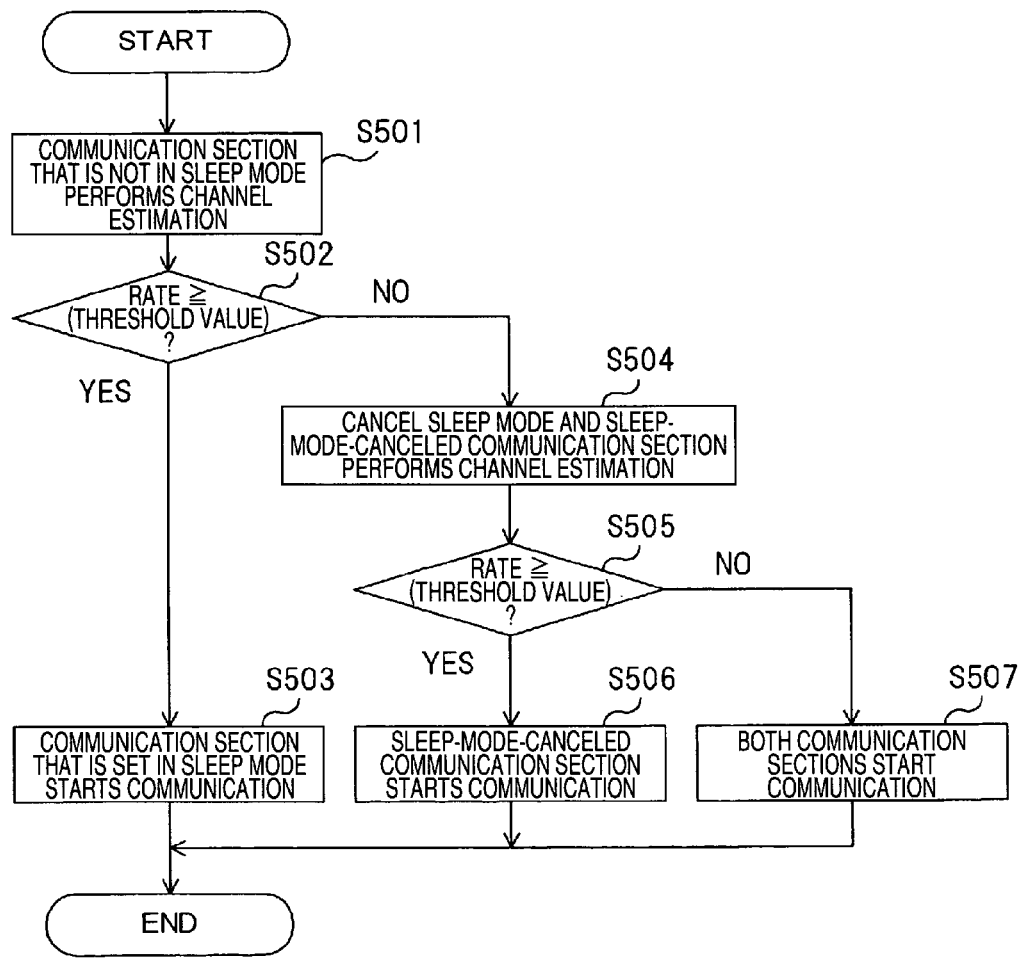
FIG. 10 is a flowchart showing the procedure of a communication start process of the communication method according to the embodiment of the invention.

FIG. 10 is a flowchart showing the procedure of the communication start process (step S5 in FIG. 7) of the communication method according to the embodiment of the invention. As shown in FIG. 10, upon the start of a communication, a communication section that is not set in a sleep mode performs transmission line estimation (step S501). For example, if the powerline communication section 1 is set in a sleep mode, the wireless communication section 2 performs transmission line estimation.

The control section 3 calculates an average transmission rate of a communication using the above communication section on the basis of transmission line estimation data produced at step S501, and compares the calculated average transmission rate with a predetermined threshold value (e.g., 100 Mbps). If the comparison shows that the average transmission rate is higher than or equal to the threshold value (step S502: yes), the communication section that is not set in a sleep mode starts a communication (step S503).

On the other hand, if the average transmission rate is lower than the threshold value (step S502: no), the control section 3 cancels the sleep mode of the communication section that has been set in the sleep mode and sets the same communication section in a communication-possible state. This communication section performs transmission line estimation (step S504).

The control section 3 calculates an average transmission rate of a communication using the above communication section on the basis of transmission line estimation data produced at step S504, and compares the calculated average transmission rate with a predetermined threshold value. If the comparison shows that the average transmission rate is higher than or equal to the threshold value (step S505: yes), the sleep-mode-canceled communication section starts a communication (step S506). On the other hand, if the average transmission rate is lower than the threshold value (step S505: no), both communication sections, that is, the powerline communication section 1 and the wireless communication section 2, start a communication (step S507).

According to the above procedure, a communication is started by a communication section whose transmission line status satisfies the predetermined condition (e.g., the average transmission rate is higher than or equal to a predetermined threshold value) and the other communication section is set in a sleep mode, as a result of which the power consumption can be reduced. Furthermore, a communication is started by all the communication sections if the transmission line status of neither communication section satisfies the predetermined condition, which enables a stable communication.

Figure 11:
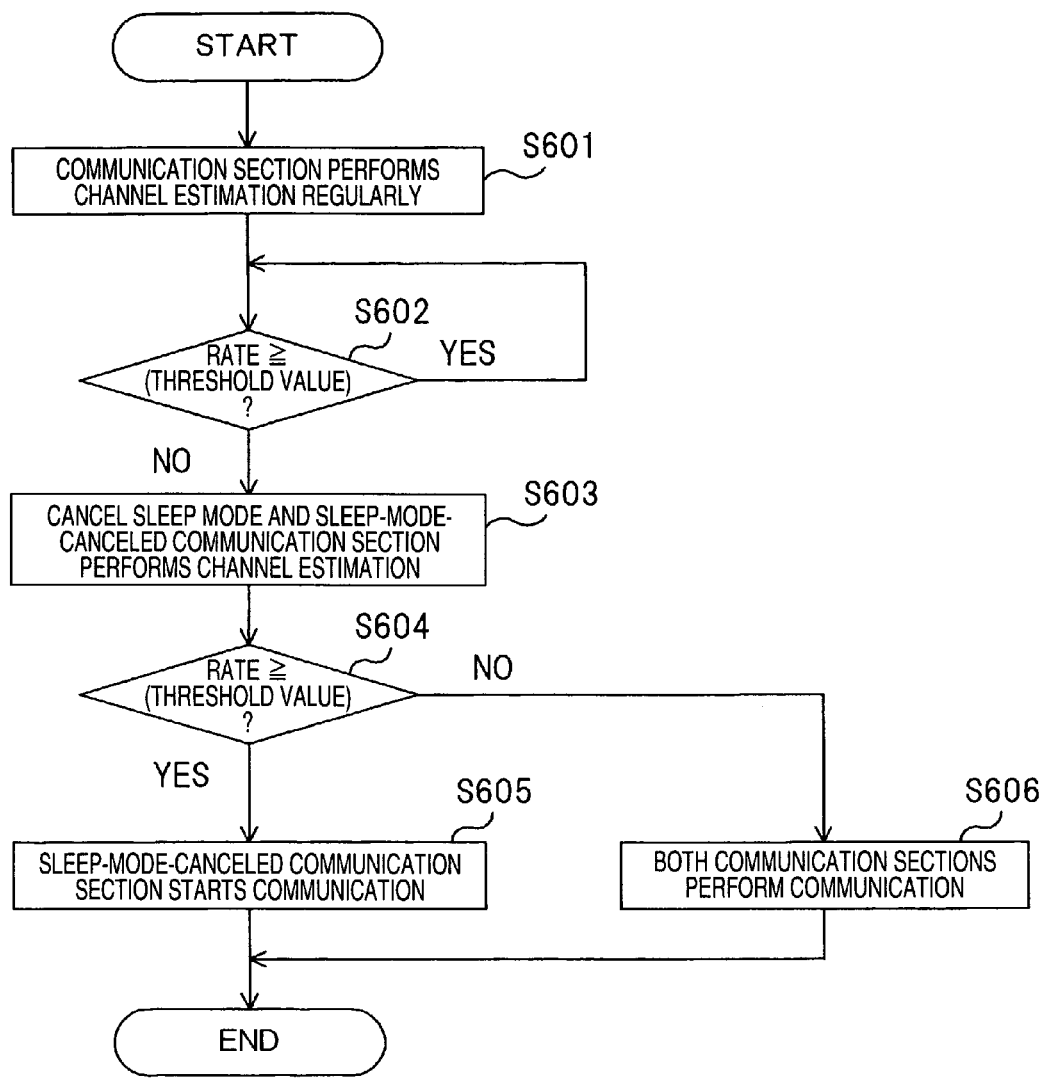
FIG. 11 is a flowchart showing a first exemplary procedure of a communication process of the communication method according to the embodiment of the invention.

FIG. 11 is a flowchart showing a first exemplary procedure of the communication process (step S6 in FIG. 7) of the communication method according to the embodiment of the invention. This exemplary procedure corresponds to a case that there exists a communication section that is set in a sleep mode.

As shown in FIG. 11, a communication section that is doing a communication performs transmission line estimation regularly (step S601). If the powerline communication section 1, for example, is doing a communication, the channel estimation section 30 performs transmission line estimation regularly.

The control section 3 calculates an average transmission rate of a communication using the above communication section on the basis of transmission line estimation data produced at step S601, and compares the calculated average transmission rate with a predetermined threshold value (e.g., 100 Mbps). If the comparison shows that the average transmission rate is higher than or equal to the threshold value (step S602: yes), the communication section continues the communication. On the other hand, if the average transmission rate is lower than the threshold value (step S602: no), the control section 3 cancels the sleep mode and the sleep-mode-canceled communication section performs transmission line estimation (step S603). If the wireless communication section 2, for example, has been set in a sleep mode, the sleep mode of the wireless communication section 2 is canceled and the wireless communication section 2 is set in a communication-possible state. The channel estimation section 60 performs transmission line estimation.

At steps S601 and S602, the control section 3 may monitor the transmission line status (acquire data indicating it) by measuring a residual amount of data in a buffer for storing transmission data instead of monitoring the transmission line status by calculating an average transmission rate through transmission line estimation. If the status of a transmission line connected to a communication section is degraded to make it impossible to attain an expected rate, the amount of data stored in the buffer increases. Therefore, the process may move to step S603 when the amount of transmission data being monitored has become larger than or equal to a threshold value.

The control section 3 calculates an average transmission rate of a communication using the above communication section on the basis of transmission line estimation data produced at step S603, and compares the calculated average transmission rate with a predetermined threshold value. If the comparison shows that the average transmission rate is higher than or equal to the threshold value (step S604: yes), the sleep-mode-canceled communication section starts a communication (step S605). On the other hand, if the average transmission rate is lower than the threshold value (step S604: no), both communication sections, that is, the powerline communication section 1 and the wireless communication section 2, perform a communication (step S606).

According to the above procedure, when the transmission line status with a communication section that is doing a communication has degraded, a sleep mode is canceled and the sleep-mode canceled communication section starts a communication. A stable communication is thus enabled.

Figure 12:
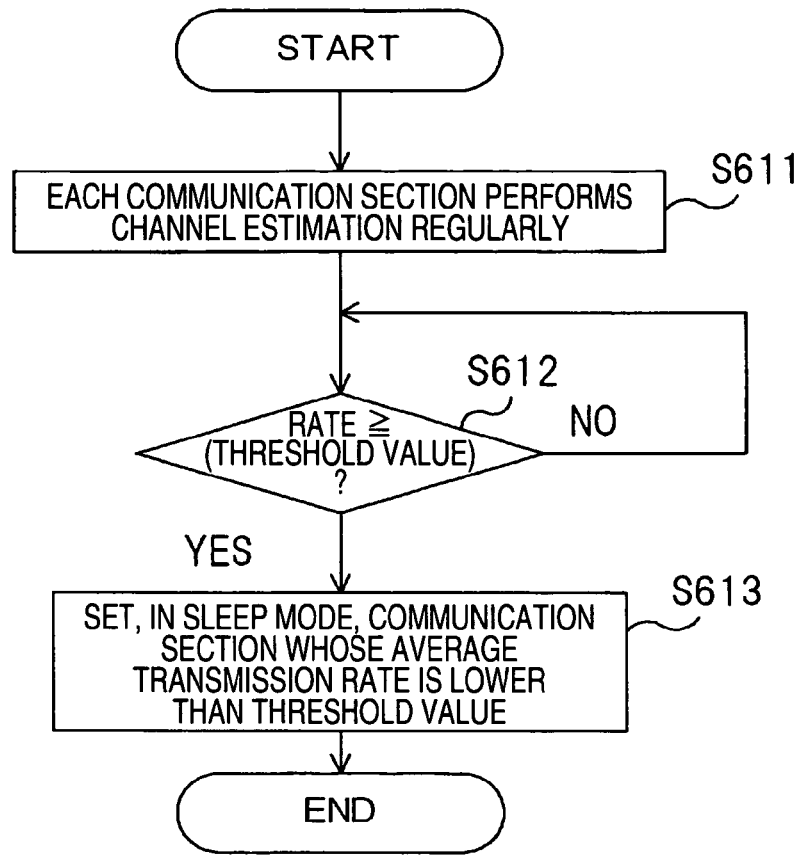
FIG. 12 is a flowchart showing a second exemplary procedure of the communication process of the communication method according to the embodiment of the invention.

FIG. 12 is a flowchart showing a second exemplary procedure of the communication process (step S6 in FIG. 7) of the communication method according to the embodiment of the invention. This exemplary procedure corresponds to a case that plural communication sections are in operation.

As shown in FIG. 12, all the communication sections that are doing a communication perform transmission line estimation regularly (step S611). If the powerline communication section 1 and the wireless communication section 2, for example, are doing a communication, the channel estimation sections 30 and 60 perform transmission line estimation regularly.

The control section 3 calculates an average transmission rate of a communication using each communication section on the basis of transmission line estimation data produced at step S611, and compares the calculated average transmission rate with a predetermined threshold value (e.g., 100 Mbps). If the comparison shows that the average transmission rates of all the communication sections are lower than the threshold value (step S612: no), the communication sections continue the communication. On the other hand if there exists a communication section whose average transmission rate is higher than or equal to the threshold value (step S612: yes), the control section 3 sets, in a sleep mode, the communication section whose average transmission rate is lower than the threshold value (step S613).

In step S612, when both the average transmission rates of powerline transmission and wireless transmission are higher than the threshold, the control section 3 may set the communication section having the higher transmission rate in step S613. If the communication apparatus 1 has three and more communication sections, the control section 3 may set the communication section having the highest transmission rate in step S613.

At steps S611 and S612, the control section 3 may monitor the transmission line status (acquire data indicating it) by measuring a residual amount of data in a buffer for storing transmission data instead of monitoring the transmission line status by calculating an average transmission rate through transmission line estimation. If the status of a transmission line connected to a communication section is degraded to make it impossible to attain an expected rate, the amount of data stored in the buffer increases. Therefore, the process may move to step S613 when the amount of transmission data being monitored has become larger than or equal to a threshold value.

According to the above procedure, a sleep mode is set if necessary when the transmission line status with a communication section that is performing a communication turns good. Therefore, the power consumption can be reduced while a stable communication is maintained.

The descriptions made above with reference to FIGS. 8-12 are directed to the case that an average transmission rate calculated from transmission line estimation data is used as a state quantity indicating a transmission line status. Instead, an actual communication rate or a parameter or the like similar to a rate such as mapping information may be used.

Figure 13:
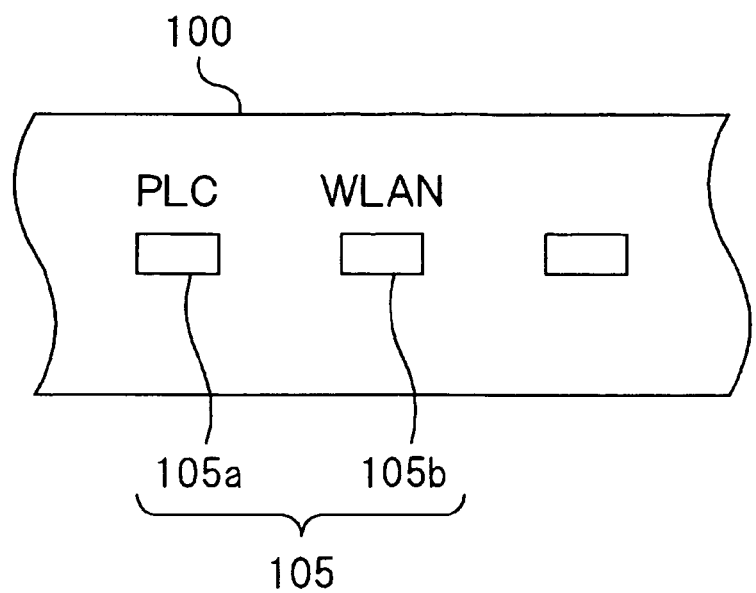
FIG. 13 shows an appearance of exemplary display units of the communication apparatus according to the embodiment of the invention.

FIG. 13 shows an appearance of exemplary display units of the communication apparatus according to the embodiment of the invention. As shown in FIG. 13, the display units 105 of the communication apparatus 100 according to the embodiment are a display unit 105a which indicates an operation state of the powerline communication section 1 and a display unit 105b which indicates an operation state of the wireless communication section 2. Each of the display units 105a and 105b has a light-emitting element such as an LED, and, for example, it is flashed during a communication, kept on during a communication-possible state, and kept off during a sleep state. As a result, a user can easily recognize which communication section is used for a communication and is in a communication-possible state or a sleep state.

The communication apparatus according to the embodiment can control the operation states of the respective communication sections when necessary in accordance with transmission line statuses etc., and hence can perform a stable, high-quality communication while keeping the power consumption low. Furthermore, since each communication apparatus controls the operation states of the communication sections in a network in which plural communication apparatus of similar kinds are connected to each other, the communication sections which perform a communication can be controlled autonomously in a distributed manner.

The embodiment of the invention is directed to the case that the communication method for performing a multi-carrier communication type wideband communication (2 to 30 MHz) is employed as an example of PLC. However, the invention is not limited to the case of using the multi-carrier communication method, and may employ the single carrier communication method or the spectrum spread method. Although the embodiment is directed to the case of using the wireless LAN communication method, a mobile communication method or the like may be used.

Furthermore, the embodiment of the invention is directed to the case of using the PLC and the wireless LAN, the invention is not limited to the case that the transmission lines are a power line and a wireless line. For example, a coaxial cable, a telephone line, a speaker line, a harness, or the like may be used as a transmission line. Therefore, although the embodiment employs the wireless communication section as an exemplary non-powerline communication section, the invention is not limited to such a case. For example, the non-powerline communication section may be a communication section using, as a transmission line, a coaxial cable, a telephone line, a speaker line, a harness, or the like.

The communication apparatus and the communication method according to the invention provide the advantage of making it possible to communicate with another communication apparatus over plural transmission lines while keeping the power consumption low. As such, they are useful when applied to, for example, a communication modem which accommodates the powerline communication and the wireless LAN.

This application is based upon and claims the benefit of priority of Japanese Patent Application No. 2006-11382 filed on Jan. 19, 2006, the contents of which are incorporated herein by reference in its entirety.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A communication apparatus which performs a communicating operation over a plurality of transmission lines, the communication apparatus comprising:
   a first communication section configured to perform a communicating operation over a first transmission line;
   a second communication section configured to perform a communicating operation over a second transmission line different from the first transmission line; and
   a control section configured to suspend the communicating operation of one of the first communication section and the second communication section during a communication start process and to suspend the communicating operation of one of the first communication section and the second communication section during a communication process which is executed after the communication start process.

2. The communication apparatus according to claim 1, wherein the first transmission line includes a powerline.

3. The communication apparatus according to claim 1, wherein the second transmission line includes a wireless line.

4. The communication apparatus according to claim 1, wherein each of the first communication section and the second communication section has a receiving circuit configured to receive a signal from another communication apparatus; and
   the control section suspends a receiving operation performed by the receiving circuit of one of the first communication section and the second communication section.

5. The communication apparatus according to claim 4, wherein each of the receiving circuits includes a plurality of circuit elements; and
   the control section suspends a function of at least one of the plurality of circuit elements.

6. The communication apparatus according to claim 4, wherein each of the receiving circuits includes a plurality of circuit elements; and
   the control section lowers, in performance, a function of at least one of the plurality of circuit elements.

7. The communication apparatus according to claim 4, wherein each of the first communication section and the second communication section has a transmitting circuit configured to transmit a signal to another communication apparatus; and
   the control section suspends a transmitting operation performed by the transmitting circuit of one of the first communication section and the second communication section.

8. The communication apparatus according to claim 7, wherein each of the transmitting circuits includes a plurality of circuit elements; and
   the control section suspends a function of at least one of the plurality of circuit elements.

9. The communication apparatus according to claim 7, wherein each of the transmitting circuits includes a plurality of circuit elements; and
   the control section lowers performance of a function of at least one of the plurality of circuit elements.

10. The communication apparatus according to claim 1, further comprising an information acquiring section configured to acquire transmission line information representing a status of each of the first transmission line and the second transmission line,
   wherein the control section suspends the communicating operation of one of the first communication section and the second communication section on the basis of the transmission line information.

11. The communication apparatus according to claim 10, wherein:
each of the first communication section and the second communication section has a receiving circuit configured to receive a signal from another communication apparatus and a transmitting circuit configured to transmit the signal to said another communication apparatus;
each of the transmitting circuits is configured to transmit the signal having a predetermined signal level to said another apparatus;
each of the receiving circuits is configured to receive the signal returned from said another apparatus; and
the information acquiring section is configured to acquire the transmission line information on the basis of both the transmitted signals and the received signals.

12. The communication apparatus according to claim 10, wherein the control section calculates a transmission rate of each of the first communication section and the second communication section on the basis of the transmission line information, and suspends the communicating operation of one of the first communication section and the second communication section on the basis of the transmission rates.

13. The communication apparatus according to claim 12, wherein each of the transmission rates is an average value.

14. The communication apparatus according to claim 12, wherein if the transmission rate of one of the first communication section and the second communication section is lower than a predeteiinined threshold value, the control section suspends the communicating operation of a communication section corresponding to the transmission rate which is lower than the predetermined threshold value out of the first communication section and the second communication section.

15. The communication apparatus according to claim 10, wherein the control section cancels a suspension state of the suspended communication section on the basis of the transmission line information.

16. The communication apparatus according to claim 1, wherein the control section calculates a transmission rate of each of the first communication section and the second communication section and activates both the first communication section and the second communication section if both the transmission rate of the first communication section and the transmission rate of the second communication section are lower than a predetermined value.

17. A communication apparatus configured to perform a communication over a plurality of transmission lines, the communication apparatus comprising:
a first communication section configured to perform a communication over a first transmission line;
a second communication section configured to perform a communication over a second transmission line different from the first transmission line;
an information acquiring section configured to acquire transmission line information representing a status of each of the first transmission line and the second transmission line; and
a control section configured to select one of the first communication section and the second communication section on the basis of the transmission line information during a communication start process, and further configured to select one of the first communication section and the second communication section on the basis of the transmission line information during a communication process which is executed after the communication start process.

18. The communication apparatus according to claim 17, wherein each of the first communication section and the second communication section has a receiving circuit configured to receive a signal from another communication apparatus and a transmitting circuit configured to transmit the signal to said another communication apparatus;
each of the transmitting circuits is configured to transmit the signal having a predetermined signal level to said another apparatus;
each of the receiving circuits is configured to receive the signal returned from said another apparatus; and
the information acquiring section is configured to acquire the transmission line information on the basis of both the transmitted signals and the received signals.

19. A communication method to perform a communication over a plurality of transmission lines, wherein the communication method comprises the steps of
performing a communicating operation over a first transmission line;
performing a communicating operation over a second transmission line different from the first line; and
suspending one of the communicating operation over the first transmission line and the communicating operation over the second transmission line during a communication start process, and further suspending one of the communicating operation over the first transmission line and the communicating operation over the second transmission line during a communication process which is executed after the communication start process.

* * * * *